US010416448B2

United States Patent
Furusawa et al.

(10) Patent No.: US 10,416,448 B2
(45) Date of Patent: Sep. 17, 2019

(54) HEAD-UP DISPLAY DEVICE

(71) Applicant: NIPPON SEIKI CO., LTD., Niigata (JP)

(72) Inventors: Hiroyuki Furusawa, Niigata (JP); Genichiro Sato, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/560,416

(22) PCT Filed: Mar. 9, 2016

(86) PCT No.: PCT/JP2016/057344
§ 371 (c)(1),
(2) Date: Sep. 21, 2017

(87) PCT Pub. No.: WO2016/152522
PCT Pub. Date: Sep. 29, 2016

(65) Prior Publication Data
US 2018/0059417 A1 Mar. 1, 2018

(30) Foreign Application Priority Data
Mar. 23, 2015 (JP) .................................. 2015-059884

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/01* (2013.01);
(Continued)

(58) Field of Classification Search
CPC ........ G02B 27/0172; G02B 2027/0178; G02B 27/0176; G02B 2027/0118;
(Continued)

(56) References Cited

U.S. PATENT DOCUMENTS 9,772,493 B2 9/2017 Ushida et al.
2006/0203351 A1* 9/2006 Kageyama ......... G02B 27/0101
359/630
(Continued)

FOREIGN PATENT DOCUMENTS

JP 2011-131651 A 7/2011
JP 2014-085539 A 5/2014
WO 2014/065097 A1 5/2014

OTHER PUBLICATIONS

International Search Report issued in International Application No. PCT/JP2016/057344, dated May 31, 2016.

*Primary Examiner* — Evan P Dzierzynski
*Assistant Examiner* — Sharrief I Broome
(74) *Attorney, Agent, or Firm* — McDermott Will & Emery LLP

(57) ABSTRACT

A head-up display includes: a display projecting light; a reflection part reflecting the light; a supported part disposed on the end of the reflection part and including a cylindrical shaft; a support, through which the shaft passes, rotatably supporting the supported part; and an elastic member which has a U-shape cross-section and in which a hole is formed in one end section and a spherical-surface protrusion protruding towards the hole is formed in the other end section that passes through the center axis of the hole. With the supported part supported by the support, the distal end of the shaft passes through the hole, the distal end-side inner circumferential edge of the shaft abuts the protrusion, and the inner surface of the one end section and that of the other end section of the elastic member cause the supported part and the support part to press against each other.

9 Claims, 5 Drawing Sheets

(52) U.S. Cl.
CPC .... *G02B 27/0101* (2013.01); *B60K 2370/152* (2019.05); *B60K 2370/155* (2019.05); *B60K 2370/31* (2019.05); *B60K 2370/334* (2019.05); *B60K 2370/52* (2019.05); *G02B 2027/0154* (2013.01)

(58) Field of Classification Search
CPC .............. G02B 27/0101; G02B 27/017; G02B 2027/0138; G02B 2027/014; G02B 27/0093; G02B 5/30; G02B 2027/015; G02B 27/01; G02B 27/0149; G02B 2027/0123; G02B 2027/0154; G06F 3/013; G06F 3/017; G06F 1/163; G06F 3/012; G06F 3/005; G06F 3/011; G06F 3/03545; G06F 3/04883; G06F 5/10; G06F 1/203; G06F 1/206; G06F 3/016; G06F 3/0317; G06F 3/0412; G06F 1/1632; G06F 3/0362; G06F 3/041
See application file for complete search history.

(56) References Cited

U.S. PATENT DOCUMENTS

| | | | | |
|---|---|---|---|---|
| 2013/0194518 A1* | 8/2013 | Moussa | ................ | G02B 7/1821 349/11 |
| 2013/0201541 A1* | 8/2013 | Sasaki | ................ | G02B 27/0149 359/221.3 |
| 2015/0286054 A1* | 10/2015 | Ushida | ................... | B60K 35/00 345/7 |

* cited by examiner

HEAD-UP DISPLAY DEVICE

CROSS REFERENCE

This application is the U.S. National Phase under 35 U.S.C. § 371 of International Application No. PCT/JP2016/057344, filed on Mar. 9, 2016, which claims the benefit of Japanese Application No. 2015-059884, filed on Mar. 23, 2015, the entire contents are hereby incorporated by reference.

TECHNICAL FIELD

The present invention relates to a head-up display having a support structure for rotatably supporting a reflection member for reflecting display light representing a predetermined image.

BACKGROUND ART

Patent Literature 1 discloses a head-up display device (HUD device) having a support structure of a reflection member, in which a first support portion for rotatably supporting a reflection member and a first supported portion provided in one end portion of the reflection member and supported by the first support portion are assembled in substantially point contact or line contact, and the first supported portion and the first support portion are pressed against each other in a rotation axis direction of the reflection member by a first elastic member S1. According to the configuration of this HUD device, even if vibrations caused by traveling of a vehicle or the like are transmitted to vibrate the HUD device, vibrations of the reflection member are suppressed and blurring of a display image to be visually recognized can be reduced as a result.

CITATION LIST

Patent Literature

Patent Literature 1: Japanese Unexamined Patent Application Publication No. 2014-85539

SUMMARY OF THE INVENTION

Problems to be Solved by the Invention

However, when the rotation of the reflection member is repeated in the state where there is room for improvement in the positioning of the first elastic member S1 pressing the first supported portion and the first support portion against each other and the vibration caused by the traveling of a vehicle and the like is transmitted and the HUD device is vibrating, the force of the first elastic member pressing the first supported portion against the first support portion is shifted from the direction along the rotation axis of the first support portion, the first elastic member and the first supported portion may not slide in point contact or line contact causing abnormal noises.

The present invention has been made in view of the above circumstances, and it is an object of the present invention to provide a head-up display device capable of reducing the possibility of occurrence of abnormal noises due to given vibrations.

In a first aspect, a head-up display device comprising:
a display for emitting display light representing an image;
a reflection part for reflecting the display light;
a supported portion provided on an end of the reflection part and has a cylindrical shaft portion;
a support portion through which the shaft portion is inserted to rotatably support the supported portion about the shaft portion; and
an elastic member having a U-shaped cross section, in which a hole portion is formed in one end portion and a spherical convex portion that is convex toward the hole portion is formed in the other end portion passing through the central axis of the hole portion,
wherein in a state where the supported part is supported by the support part, a distal end of the shaft portion is inserted into a bole portion, a distal side inner peripheral edge of the shaft portion abuts against the convex portion, and the supported part and the support part are pressed against each other by inner surfaces of the one end portion and the other end portion of the elastic member.

In a second aspect, the head-up display device according the first aspect, wherein:
the elastic member has an inclined portion in an end portion on the hole portion side, and an inclined surface for guiding the inclined portion at a distal end of the shaft portion to be inserted into the hole portion.

In a third aspect, the head-up display device according to the first aspect or the second aspect, wherein:
the supported part is formed with a plurality of spherical surfaces at predetermined intervals, and
the support part is formed with a sliding surface in contact with the spherical surface at the predetermined intervals.

Effect of the Invention

According to the present invention, it is possible to provide a head-up display device capable of reducing the possibility of occurrence of abnormal noises due to given vibrations.

MODE FOR CARRYING OUT THE INVENTION

A HUD device according to an embodiment of the present invention will be described with reference to the drawings.

Figure 1:
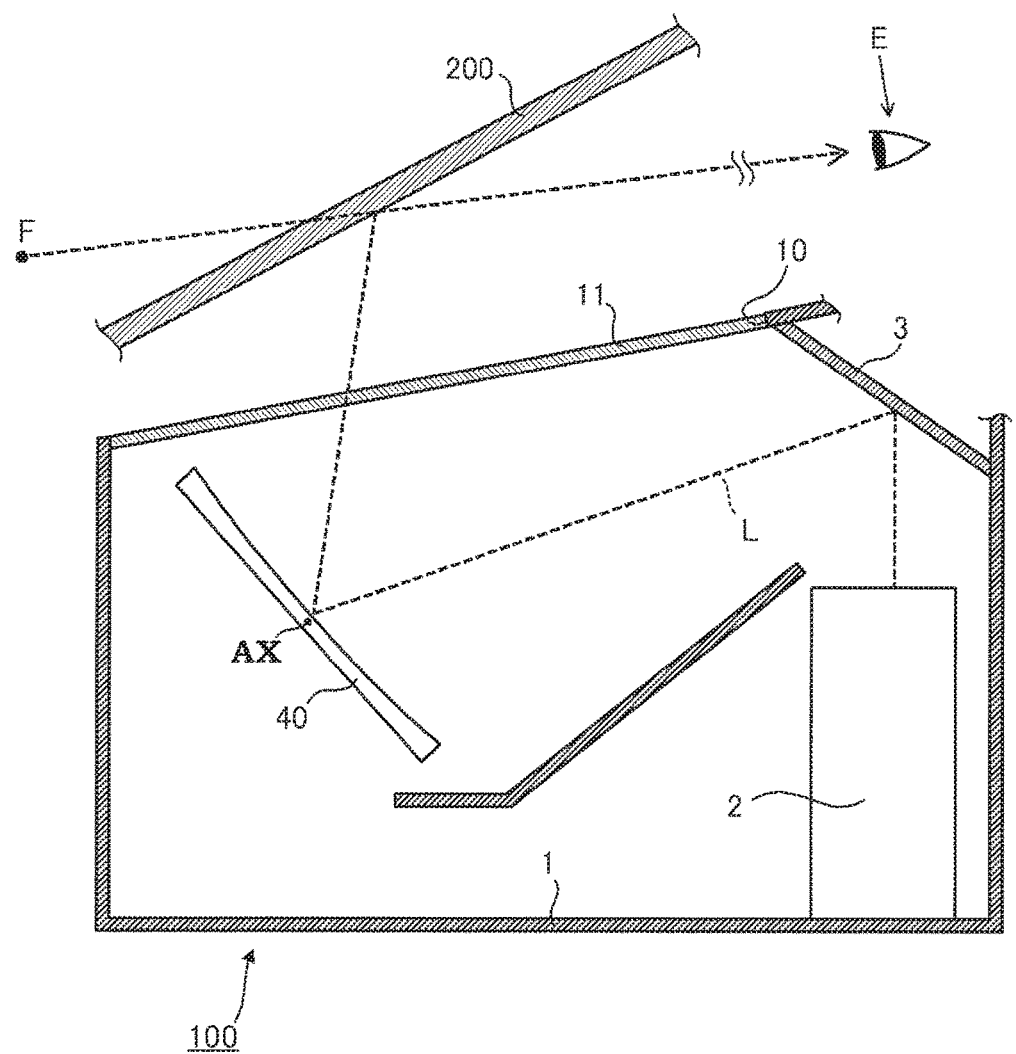
FIG. 1 is a schematic cross-sectional view showing a configuration of a HUD device according to an embodiment of the present invention.
Figure 2A:
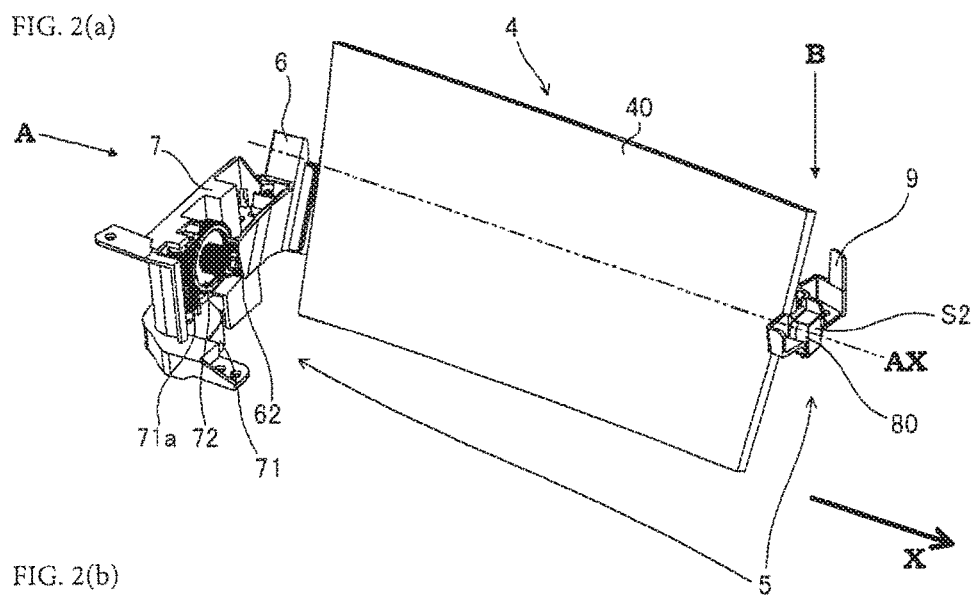
FIG. 2(a) is a perspective view of a reflection part and a reflection part rotating mechanism provided in the HUD device. 2(b) is an exploded perspective view of a reflection part and a reflection part rotating mechanism of the HUD device.

The HUD device 100 is, for example, mounted on an automobile, and as shown in FIG. 1 and the like, includes a housing 1, a display 2, a plane mirror 3, a reflection part 4 having a reflection member 40, a reflection part rotating mechanism 5 (see FIGS. 2(a) and (b)) and a circuit board (not shown). In FIG. 1, the configuration of the reflection part 4 other than the reflection member 40 and the reflection part rotating mechanism 5 are omitted.

The HUD device 100 reflects display light L representing a predetermined image emitted from the display 2 with the plane mirror 3 and the reflection part 4, and irradiates the light to a windshield 200 of a vehicle on which the HUD device 100 is mounted for displaying the image. The contents displayed by the HUD device 100 in this way are vehicle information such as a traveling speed of a vehicle and various warnings, navigation information, and the like.

The housing 1 is made of, for example, black synthetic resin, and houses the display 2, the plane mirror 3, the reflection part 4, the reflection part rotating mechanism 5, and the circuit board (not shown). In a part of the housing 1 facing the windshield 200, an opening 10 is formed to pass display light L (described later) through the windshield 200 and the opening 10 is covered with a translucent cover 11.

The display 2 emits display light L representing an image (notification image) for notifying predetermined information (various kinds of vehicle information, navigation information, etc.), and includes, for example, a transmissive liquid crystal display comprising a liquid crystal panel and a light source for backlight, or a self-lighting display.

The plane mirror 3 reflects the display light L emitted from the display 2 toward the reflection part 4.

Figure 2B:
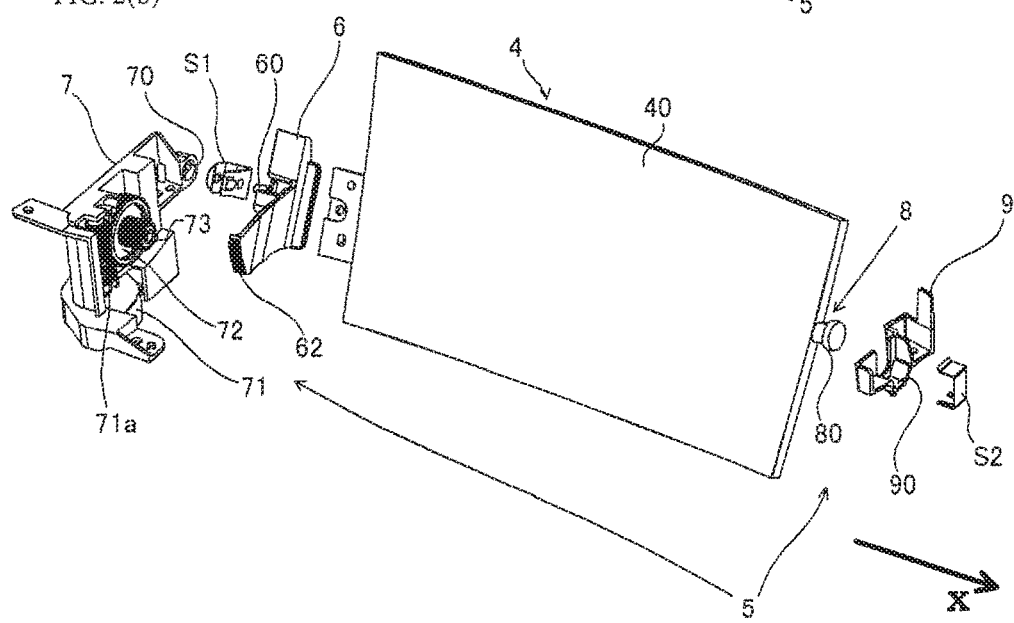
Figure 3:
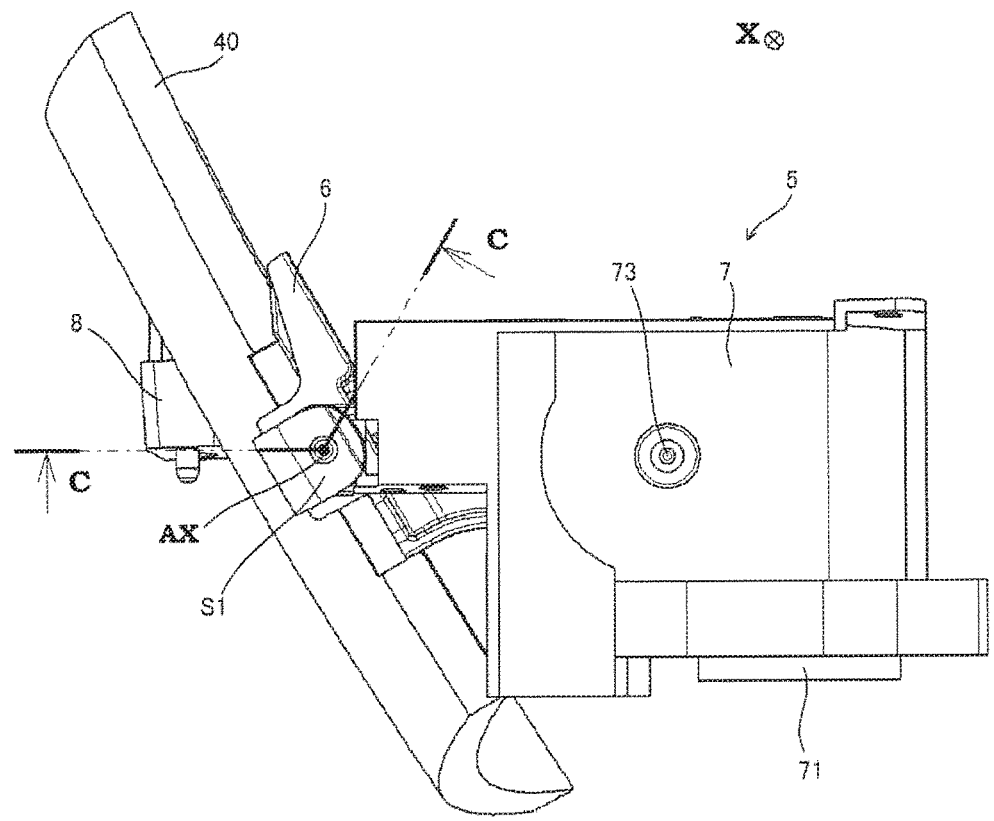
FIG. 3 is a view of the reflection part and the reflection part rotating mechanism seen from a direction of an arrow shown in FIG. 2(a).

As shown in FIGS. 2(a) and 2(b), the reflection part 4 has a reflection member 40 for further reflecting the display light L reflected by the plane mirror 3 and emitting it toward the windshield 200, and a first supported part 6 and a second supported part 8. The reflection member 40 is made of a concave mirror in which a reflection film is formed on the surface of a base material made of, for example, a synthetic resin material by means of vapor deposition or the like.

The display light L reflected by the reflection member 40 passes through the translucent cover 11 provided in the opening 10 of the housing 1 and goes to the windshield 200. The display light L reached and reflected by the windshield 200 forms a virtual image (a display image viewed by an observer E) of a notification image in a forward position F of the windshield 200 (see FIG. 1), and transmits light from the front. Thereby, the HUD device 100 can cause the observer E (mainly a vehicle driver) to visually recognize both a virtual image and an outside scene or the like actually existing in front of the HUD device 100.

The reflection part rotating mechanism 5 rotates the reflection part 4 about the rotation axis AX, and as shown in FIGS. 2(a) and 2(b), comprises a first support part 7, a first elastic member S1, a second support part 9, and a second elastic member S2.

Figure 4A:
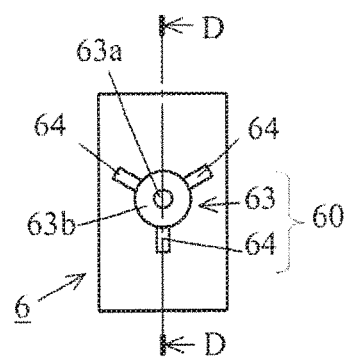
FIG. 4(a) is a front view of a first supported part constituting a reflection part. 4(b) is a cross-sectional view taken along the line D-D in the drawing (a).
Figure 4B:
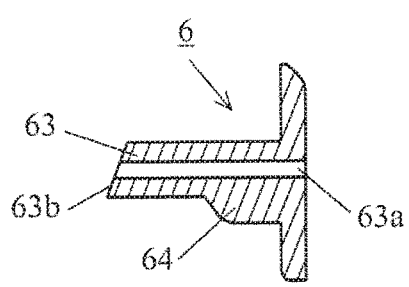

In FIGS. 2(a), (b) to FIG. 4, the X-axis parallel to the rotation axis AX is indicated by an arrow. In the following, in order to facilitate understanding of the configuration of the reflection part rotating mechanism 5, each part of the reflection part rotating mechanism 5 will be explained assuming that a direction in which the arrow indicating the X axis is directed is defined as a "+X direction" and an opposite direction is defined as a "−X direction".

The first supported part 6 provided in the reflection part 4 is formed of, for example, a predetermined synthetic resin, and is a member that is supported by the first support part 7 to be rotatable about the rotation axis AX. The first supported part 6 is attached and fixed to the −X direction side end portion of the reflection member 40, thereby being immovable relative to the reflection member 40 (the first supported part 6 may be integrally formed with the reflection part 4). The first supported part 6 is provided with a first supported portion 60, which is a portion projecting in the −X direction (see FIG. 2(b), FIG. 4). The first supported portion 60 will be described in detail later.

The first support part 7 is made of, for example, a predetermined synthetic resin, and is a member that is attached to the housing 1, thereby being immovable relative to the housing 1, and supports the first supported part 6. The first support part 7 is provided with a first support portion 70, which is a portion contacting the first supported portion 60 and supporting the first supported portion 60 (see FIG. 2(b), FIG. 4). The first support portion 70 will be described in detail later.

The first support part 7 is configured as a member for holding a motor 71 and a gear 72. The motor 71 generates motive power for rotating the reflection part 4 about the rotation axis AX, and is, for example, a stepping motor. As shown in FIGS. 2(a) and 2(b), a screw gear 71a is attached to the rotary shaft (not shown) of the motor 71. The gear 72 is held in the first support part 7 via a shaft 73 along the X direction to be rotatable about an axis parallel to the rotation axis AX, and is engaged with the screw gear 71a. Further, the gear 72 is fastened to a gear portion 62 formed in the first supported part 6. When the screw gear 71a is rotated by the motor 71, the gear 72 to be fastened thereto rotates. Since the gear 72 is also fastened to the gear portion 62 formed in the first supported part 6 of the reflection part 4, the reflection part 4 rotates about the rotation axis AX by the power of the motor 71.

In the reflection part rotating mechanism 5, by transmitting the power of the motor 71 to the reflection part 4 via the screw gear 71a and the gear 72 in this manner, the reflection part 4 can be rotated about the rotation axis AX.

The first elastic member S1 comprises a leaf spring made of metal such as aluminum having a substantially U-shaped cross section. The first elastic member S1 is fastened to the first supported portion 60 and the first support portion 70, and holds the first supported portion 60 and the first support portion 70 by an inner surface having a substantially U-shaped cross section. The first elastic member S1 will be described in detail later.

The second supported part 8 provided in the reflection part 4 is a member supported by the second support part 9 to be rotatable about the rotation axis AX. The second supported part 8 is located on the +X direction side end portion of the reflection part 4, and is immovable relative to the reflection member 40. For example, the second supported part 8 is formed integrally with the reflection member 40 or fixed to the reflection member 40. The second supported part 8 has a second supported portion 80 protruding in the +X direction (see FIG. 2(b)).

The second support part 9 is made of, for example, a predetermined synthetic resin and is attached to the housing 1 to be immovable relative to the housing 1, and supports the second supported part 8. The second support part 9 is provided with a second support portion 90 (see FIG. 2(b)), which contacts the second supported portion 80 and supports the second supported portion 80.

The second elastic member S2 comprises a leaf spring made of metal such as aluminum having a substantially U-shaped cross section as shown in FIG. 2(b). The second elastic member S2 is disposed to press the second supported portion 80 against the second support portion 90.

A circuit board (not shown) is a printed circuit board, which is disposed, for example, at a predetermined position in the housing 1, and is provided with a control unit (not shown) composed of a microcontroller combining a CPU, an arithmetic unit such as a RAM and a ROM, and a storage unit. The control unit of the circuit board is electrically connected to each of the display 2 and the motor 71. The control unit obtains vehicle state information transmitted from an external device (not shown) such as a vehicle ECU (Electronic Control Unit) via a communication line, and drives the display 2 accordingly (that is, causes the display 2 to display a predetermined notification image). The HUD device 100 is provided with an input means (not shown) used by a user, such as an observer E to adjust an angle of the reflection part 4 (this input means may be an external unit electrically connected to the control unit other than the HUD device 100). The control unit drives the motor 71 and rotates the rotation axis of the motor 71 by a predetermined angle according to the operation content from the input means of the user. Thereby, the reflection part 4 is rotatable about the rotation axis AX.

Hereinafter, the first supported portion 60, the first support portion 70, and the first elastic member S1 will be described in detail.

As shown in FIG. 2(*b*), the first supported portion 60 is provided in one end portion (an end portion on the −X direction side) of the reflection part 4 along the rotation axis AX, and has a shape protruding in the −X direction (convex shape). On the other hand, as shown in FIG. 2(*b*), the first support portion 70 to support the first supported portion 60 is formed as a hole portion (a recess) into which the first supported portion 60 is inserted. The first elastic member S1 presses the first supported portion 60 against the first support portion 70 to sandwich them in a state where the first supported portion 60 is being assembled with the first support portion 70.

As shown in FIG. 4, the first supported portion 60 includes a cylindrical shaft portion 63 having a through hole 63*a* and three spherical portions 64 provided at intervals of 120° around the shaft portion 63. An inclined surface 63*b* is formed at the distal end of the shaft portion 63. Since the first supported portion 60 is formed with the cylindrical shaft portion 63 and is provided with a plurality of spherical portions 64 at predetermined intervals, this suppresses generation of sink marks (dents and dimples caused by molding shrinkage) when forming the first supported portion 60 using a metal mold such as injection molding.

Figure 5:
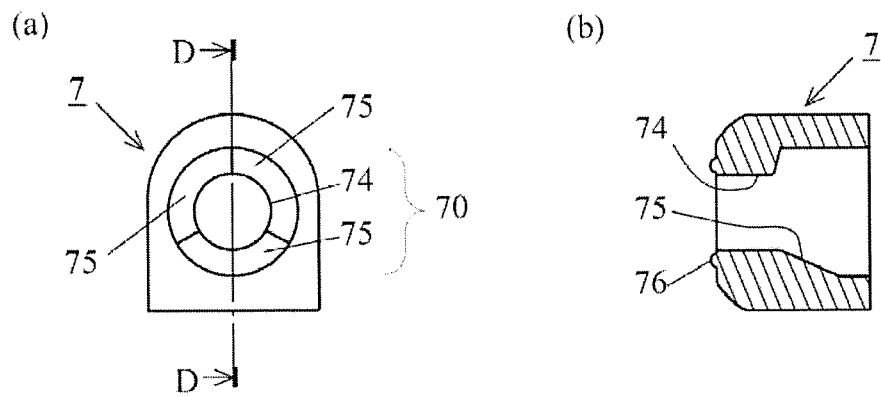
FIG. 5(a) is a front view of a first support part constituting a reflection part rotating mechanism. 5(b) is a cross-sectional view taken along the line D-D in the same drawing (a).

As shown in FIG. 5, the first support portion 70 includes a first hole portion 74 that is a cylindrical hole slightly larger than the shaft portion 63 and a second hole portion 75 communicating with the first hole portion 74. The shaft portion 63 is inserted into the first hole portion 74 and the second hole portion 75. The first hole portion 74 accommodates the shaft portion 63, and the second hole portion 75 accommodates the spherical portion 64. The inner surface forming the second hole portion 75 is formed with sliding surfaces of a shape along a side surface of a triangular pyramid having a height in the direction of the rotation axis AX, and each sliding surface abuts against the spherical portion 64 in pairs. A convex 76 is formed around the edge of the first hole portion 74 of the first support portion 70 to surround the first hole portion.

Figure 6:
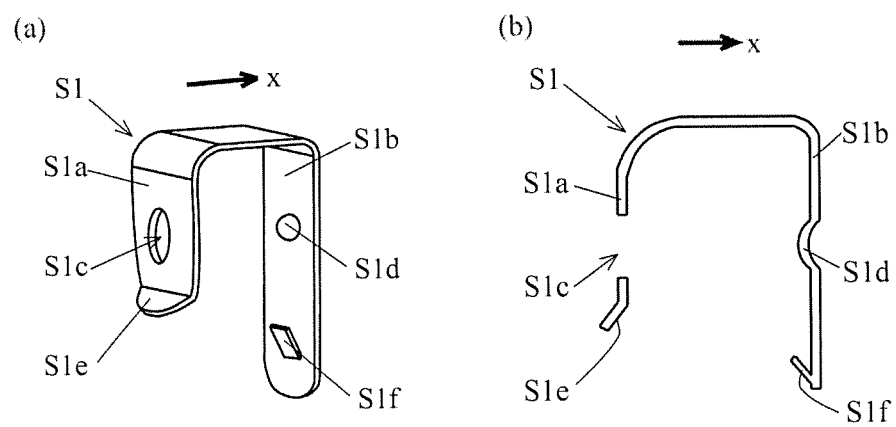
FIG. 6(a) is a perspective view of a first elastic member sandwiching a first supported part and a first support part. 6(b) is a cross-sectional view of the first elastic member.

As shown in FIG. 6, the first elastic member S1 is a leaf spring having a U-shaped cross section and sandwiched between one end portion S1*a* and the other end portion S1*b*. A hole portion S 1*c* is provided in one end portion S1*a* of the first elastic member S1, and a spherical convex portion S1*d* protruding toward the hole portion S1*c* is provided on the other end portion S1*b*. An inclined portion S1*e* bending to warp outward is provided at the end of one end portion S1*a* of the first elastic member S2, and a hook portion S1*f* is provided on the inside of the end of the other end portion S1*b* of the first elastic member S1.

Figure 7:
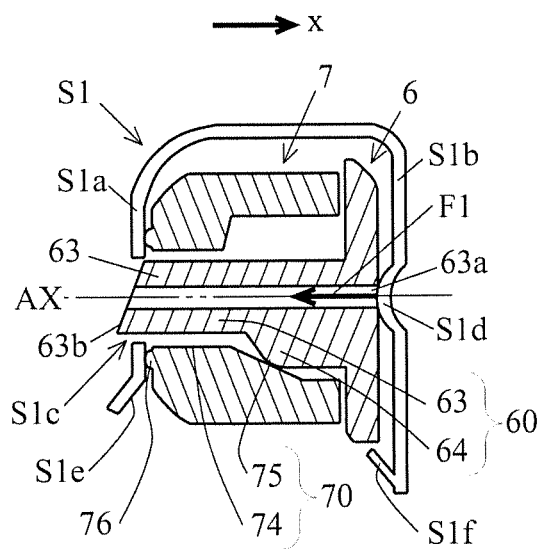
FIG. 7 is a cross-sectional view taken along the line C-C in FIG. 3 showing a partial configuration of a reflection part and a reflection part rotating mechanism.

As shown in FIG. 7, in the first supported portion 60, the shaft portion 63 is inserted into the first hole portion 74, and the distal end farming the inclined surface 63*b* of the shaft portion 63 protrudes from the first hole portion 74 to be assembled to the first support portion 70.

The first elastic member S1 is attached to the first supported portion 60 assembled to the first support portion 70. The attachment of the first elastic member S1 is performed by inserting one end forming the inclined surface 63*b* of the shaft portion 63 of the first supported portion 60 protruding from the first hole portion 74 into the hole portion S is so that the convex 76 of the first support portion 70 and the inner surface of the one end portion S1*a* are in line contact and the inner peripheral edge of the other end side (end) of the shaft portion 63 and the convex of the other end portion S1*b* are in line contact.

When the first elastic member S1 is attached to the first supported portion 60 assembled to the first support portion 70 as described above, the first support portion 70 and the first supported portion 60 are held between the insides of the one end portion S1*a* and the other end portion S1*b* of the first elastic member S1, and the first supported portion 60 is pressed and fixed to the first support portion 70 with no gap between the first supported portion 60 and the first support portion 70 and reduced rattling.

The first supported portion 60 and the first support portion 70 are arranged such that the spherical portion 64 and the second hole portion 75 are substantially in point contact or line contact with a contact resistance suppressed as much as possible, and the first supported portion 60 is rotatably supported by the first support portion 70.

The inner surface of the one end portion S1*a* of the attached first elastic member S1 is in line contact with the convex 76 of the first support portion 70, the inner peripheral edge of the other end side (the distal end) of the shaft portion 63 is in line contact with the convex portion S1*d* of the other end portion, and the first elastic member S1 is positioned in the through hole portion 63*a* of the first supported portion 60, so that the first elastic member S1 rotates without hindering the rotation of the first supported portion 60. This reduces the possibility that the force F1 for pressing the first supported portion 60 against the first support portion 70 by the holding of the first elastic member S1 is displaced from the direction along the center (rotation axis AX) of the shaft portion 63, and generation of abnormal noise is suppressed.

In addition, when attaching the first elastic member S1, the inclined portion S1*e* is guided along the inclined surface 63*b* of the shaft portion 63 to facilitate the attachment, and after the attachment, falling off is prevented by the hook portion S1*f*.

The HUD device 100 described above comprises a display 2 for emitting display light L representing an image, a reflection part 4 for reflecting the display light L, a supported portion 60 provided in the end of the reflection part 4 and having a cylindrical shaft portion 63, a support portion 70 through which the shaft portion 63 is inserted to rotatably support the supported portion 60 about the shaft portion 63, an elastic member having a U-shaped cross section, in which a hole portion S1*c* is formed in one end portion S1*a* and a spherical convex portion S1*d* that is convex toward the hole portion S1*c* is formed in the other end portion S1*b* passing through the central axis of the hole portion S1c, wherein in a state where the supported part 60 is supported by the support part 70, the distal end of the shaft portion 63 is inserted into the hole portion S1c, the distal side inner peripheral edge of the shaft portion 63 abuts against the convex portion S1d, and the supported part 60 and the support part 70 are pressed against each other by the inner surfaces of the one end portion S1a and the other end portion S1b of the elastic member S1.

With this configuration, the distal end of the cylindrical shaft portion 63 of the supported part (first supported portion) 60 is inserted into the hole portion S1c of the first elastic member S1, and the inner peripheral edge of the other end side (end) of the cylindrical shaft portion 63 and the spherical surface of the convex portion S1d of the other end portion S1b are in line contact and positioned. This reduces the possibility that a force F1 for pressing the supported part (first supported portion) 60 and the support part (first support portion) 70 against each other by the first elastic member S1 deviates from the center (rotation axis AX) of the shaft portion 63 of the supported parts (the first supported portion) 60. As a result, even if vibrations caused by the traveling of a vehicle or the like are transmitted and the HUD device 100 is vibrated, the force F1 is not displaced from the center (the rotation axis AX) of the shaft portion 63 of the supported parts (the first supported portion) 60, and generation of abnormal noise is suppressed.

The HUD device 100 according to an embodiment of the present invention has been described above. The present invention is not limited to this and modifications (including deletion of constituent elements) can be added to the embodiments and drawings without departing from the gist of the present invention.

Figure 8:
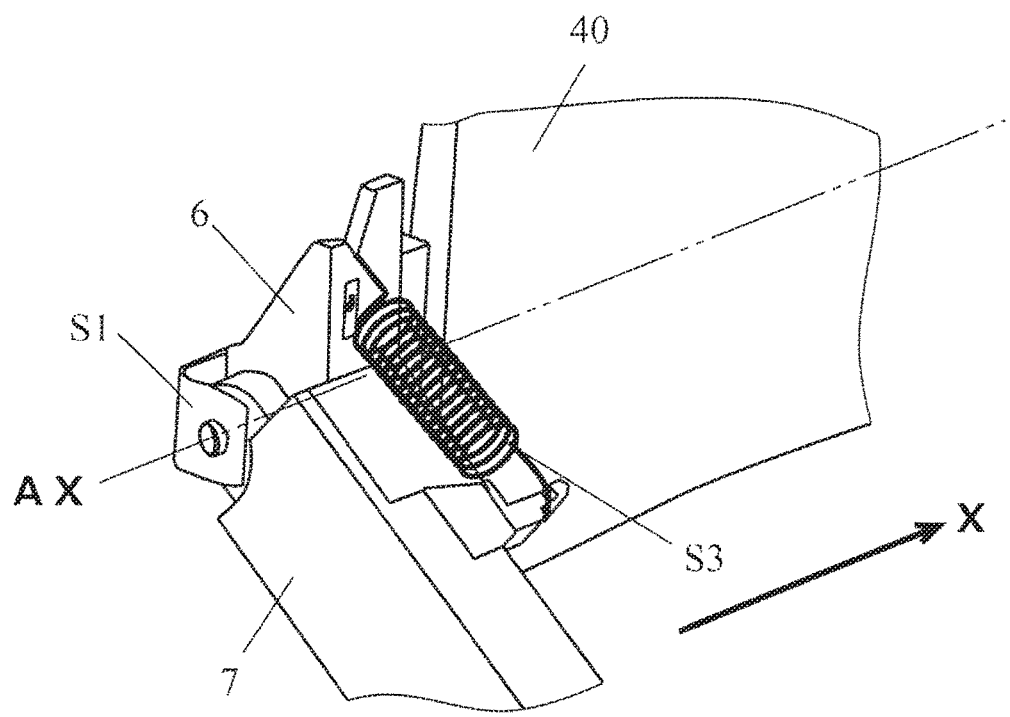
FIG. 8 is a perspective view showing a modified example of the reflection part and the reflection part rotating mechanism.

For example, in the present invention, as shown in FIG. 8, it is preferable to provide a third elastic member, which pulls mutually the first supported part 6 provided in the reflection part 4 and the first support part 7 rotatably supporting the first supported part 6 about the rotation axis AX in the direction orthogonal to the rotation axis line AX. By urging the first supported part 6 and the first support part 7 constantly by the third elastic member to attract each other in the direction orthogonal to the rotation axis AX, backlash of the motor 71 and the screw gear 71a and the gear 72 transmitting power of the motor 71 is eliminated, rattling is reduced, and vibration resistance is improved.

INDUSTRIAL APPLICABILITY

The present invention is suitable as a head-up display device mounted on a vehicle.

DESCRIPTION OF REFERENCE NUMERALS

100 HUD device
1 Housing
2 Display
3 Plane mirror
4 Reflection part
40 Reflection member
6 First supported part
60 First supported portion
63 Shaft portion
63a Through hole
63b Inclined surface
64 Spherical part
7 First support part
70 First support portion
74 First hole portion
75 Second hole portion
S1 Elastic member
S1a One end portion
S1b Other end portion
S1c Hole portion
S1d Convex portion
S1e Inclined portion
S1f Hook portion

The invention claimed is:

1. A head-up display device in which display light representing an image emitted from a display is reflected by a reflection part, the head-up display device comprising:
   a supported portion provided at one end of the reflection part along a rotation axis of the reflection part;
   a support portion that rotatably supports the supported portion; and
   an elastic member that presses the supported portion and the support portion against each other in the rotation axis direction,
   wherein the elastic member comprises 1) a first portion including a first end and a second end opposite the first end, 2) a second portion being in parallel with the first portion and including a third end and a fourth end opposite the third end, and 3) a leaf spring extending between the first end of the first portion and the third end of the second portion, and
   wherein the second portion comprises, at the fourth end of the second portion, a hook portion that protrudes from an inner surface of the second portion toward the first portion so that the supported portion is sandwiched between the hook portion and the leaf spring.

2. The head-up display device of claim 1, wherein the support portion comprises a sliding surface,
   wherein the sliding surface is formed at the support portion in a shape along a side surface of a triangular pyramid having a height direction along the rotation axis,
   wherein the sliding surface comes into point contact or linear contact with the supported portion, and
   wherein the supported portion slides on the sliding surface concurrently with rotation of the reflection part.

3. A head-up display device in which display light representing an image emitted from a display is reflected by a reflection part, the head-up display device comprising:
   a supported portion provided at one end of the reflection part along a rotation axis of the reflection part, the supported portion including a shaft portion, the shaft portion including a hole;
   a support portion that rotatably supports the supported portion; and
   an elastic member that presses the supported portion and the support portion against each other in the rotation axis direction, the elastic member including a convex portion,
   wherein an opening of the hole of the supported portion abuts the convex portion of the elastic member, and
   wherein the opening of the hole of the supported portion and the convex portion of the elastic member are in contact with each other.

4. The head-up display device of claim 3, wherein the support portion comprises a sliding surface,
   wherein the sliding surface is formed at the support portion in a shape along a side surface of a triangular pyramid having a height direction along the rotation axis, wherein the sliding surface comes into point contact or linear contact with the supported portion, and wherein the supported portion slides on the sliding surface concurrently with rotation of the reflection part.

5. The head-up display device of claim 3, wherein the shaft portion of the supported portion is a cylindrical shaft, and the supported portion includes a first spherical portion and a second spherical portion that are spaced at an angle about the cylindrical shaft.

6. A head-up display device in which display light representing an image emitted from a display is reflected by a reflection part, the head-up display device comprising:

a supported portion provided at one end of the reflection part along a rotation axis of the reflection part, the supported portion including:

a cylindrical shaft;

a first spherical portion; and a second spherical portion, wherein the first spherical portion and the second spherical portion are spaced at an angle about the shaft;

a support portion that rotatably supports the supported portion, the support portion including a sliding surface, the sliding surface in a shape along a side surface of a triangular pyramid having a height in a direction along the rotation axis of the reflection part; and an elastic member that presses the supported portion and the support portion against each other in the rotation axis direction, wherein the sliding surface of the support portion comes in point contact or linear contact with the first spherical portion or the second spherical portion of the supported portion while suppressing a contact resistance between the sliding surface and the first spherical portion or the second spherical portion of the supported portion.

7. The head-up display device of claim 6, wherein the supported portion slides on the sliding surface concurrently with rotation of the reflection part.

8. The head-up display device of claim 6, wherein the supported portion includes a third spherical portion, and wherein the first spherical portion, the second spherical portion, and the third spherical portion are spaced at an angle of 120 degrees from each other about the shaft.

9. The head-up display device of claim 5, wherein the supported portion includes a third spherical portion, and wherein the first spherical portion, the second spherical portion, and the third spherical portion are spaced at an angle of 120 degrees from each other about the shaft.

* * * * *